United States Patent
Davis

(10) Patent No.: US 8,516,393 B2
(45) Date of Patent: Aug. 20, 2013

(54) APPARATUS, SYSTEM, AND METHOD FOR PRESENTING IMAGES IN A MULTIPLE DISPLAY ENVIRONMENT

(75) Inventor: Abel Davis, Salt Lake City, UT (US)

(73) Assignee: Robert Pedersen, II, Salt Lake City, UT (US)

( * ) Notice: Subject to any disclaimer, the term of this patent is extended or adjusted under 35 U.S.C. 154(b) by 520 days.

(21) Appl. No.: 11/858,795

(22) Filed: Sep. 20, 2007

(65) Prior Publication Data

US 2008/0148184 A1    Jun. 19, 2008

Related U.S. Application Data

(60) Provisional application No. 60/870,579, filed on Dec. 18, 2006.

(51) Int. Cl.
*G06F 3/14* (2006.01)
*G06F 3/17* (2006.01)

(52) U.S. Cl.
USPC .......... 715/810; 715/835; 705/4; 725/86; 345/1.1; 361/679.04; 348/220.1; 340/988

(58) Field of Classification Search
USPC .......... 715/200–277, 835; 700/701–799, 700/800–866; 709/201–229; 705/4, 50–79; 725/86; 345/30–111; 340/988; 361/679.04; 348/220.1
See application file for complete search history.

(56) References Cited

U.S. PATENT DOCUMENTS

| | | | |
|---|---|---|---|
| 5,300,943 A | 4/1994 | Jakobs et al. | |
| 5,307,055 A | 4/1994 | Baskin et al. | |
| 5,564,002 A | 10/1996 | Brown | |
| 5,634,018 A | 5/1997 | Tanikoshi et al. | |
| 5,694,150 A | 12/1997 | Sigona et al. | |
| 5,796,577 A | 8/1998 | Ouchi et al. | |
| 5,841,418 A | 11/1998 | Bril et al. | |
| 5,920,694 A | 7/1999 | Carleton et al. | |
| 6,008,807 A | 12/1999 | Bretschneider et al. | |
| 6,028,537 A * | 2/2000 | Suman et al. | 340/988 |
| 6,091,408 A | 7/2000 | Treibitz et al. | |
| 6,094,341 A | 7/2000 | Lin | |
| 6,184,863 B1 | 2/2001 | Sibert et al. | |

(Continued)

FOREIGN PATENT DOCUMENTS

WO    2005067479 A2    7/2005

OTHER PUBLICATIONS

European Patent Office, Supplementary European Search Report, Jul. 23, 2010.

*Primary Examiner* — Ruay Ho
(74) *Attorney, Agent, or Firm* — Kunzler Law Group

(57) ABSTRACT

An apparatus, system, and method for presenting images in a multiple display environment. The present invention includes a computer-readable medium with instructions for receiving from a primary user a selected portion from a primary screen, where the selected portion is one of an image and a portion of a program. The selected portion is then displayed on one or more secondary screens. The primary user is presented with a tool to compose the secondary screen, and can also see the secondary user's input to the system. The invention also includes dynamically updating the secondary screen in response to changes in the program that result in a change in the display on the primary screen. Also disclosed is a multi-screen laptop computer ideally suited for multi-screen presentations, and a dual-monitor display device which can be easily connected to a computer to facilitate multi-screen presentations.

12 Claims, 8 Drawing Sheets

(56) References Cited

U.S. PATENT DOCUMENTS

| | | |
|---|---|---|
| 6,259,597 B1 | 7/2001 | Anzai et al. |
| 6,266,241 B1 | 7/2001 | Van Brocklin et al. |
| 6,295,038 B1 | 9/2001 | Rebeske |
| 6,299,464 B1 | 10/2001 | Chen |
| 6,522,309 B1* | 2/2003 | Weber .................. 345/1.1 |
| 6,532,146 B1 | 3/2003 | Duquette |
| 6,573,913 B1 | 6/2003 | Butler et al. |
| 6,667,878 B2 | 12/2003 | Ponx |
| 6,862,005 B2 | 3/2005 | Someya |
| 6,903,927 B2 | 6/2005 | Anlauff |
| 7,002,793 B2* | 2/2006 | Imsand .................. 361/679.04 |
| 7,068,294 B2 | 6/2006 | Kidney et al. |
| 7,136,282 B1 | 11/2006 | Rebeske |
| 7,176,882 B2 | 2/2007 | Jenssen |
| 7,237,202 B2 | 6/2007 | Gage |
| 7,239,346 B1* | 7/2007 | Priddy .................. 348/220.1 |
| 7,240,287 B2 | 7/2007 | Qureshi et al. |
| 7,333,939 B1* | 2/2008 | Stender et al. .................. 705/4 |
| 2001/0050658 A1 | 12/2001 | Adams |
| 2002/0049978 A1* | 4/2002 | Rodriguez et al. .................. 725/86 |
| 2002/0085030 A1 | 7/2002 | Ghani |
| 2003/0001795 A1 | 1/2003 | Stasko |
| 2003/0164806 A1 | 9/2003 | Krempl |
| 2003/0179154 A1 | 9/2003 | Demsky et al. |
| 2004/0113935 A1 | 6/2004 | O'Neal et al. |
| 2004/0210846 A1 | 10/2004 | Olsen |
| 2005/0091610 A1 | 4/2005 | Frei et al. |
| 2005/0237269 A1 | 10/2005 | Connor et al. |
| 2005/0253775 A1 | 11/2005 | Stewart |
| 2006/0031779 A1 | 2/2006 | Theurer et al. |
| 2006/0077117 A1 | 4/2006 | Okuley |
| 2006/0082518 A1 | 4/2006 | Ram |
| 2006/0168535 A1 | 7/2006 | Oki |
| 2006/0176241 A1 | 8/2006 | Sampsell |
| 2006/0214871 A1 | 9/2006 | Iwamura |
| 2006/0242259 A1 | 10/2006 | Vallabh et al. |
| 2007/0282948 A1 | 12/2007 | Praino et al. |
| 2008/0028338 A1* | 1/2008 | Kodosky et al. .................. 715/835 |
| 2008/0034435 A1 | 2/2008 | Grabarnik et al. |

* cited by examiner

APPARATUS, SYSTEM, AND METHOD FOR PRESENTING IMAGES IN A MULTIPLE DISPLAY ENVIRONMENT

CROSS-REFERENCES TO RELATED APPLICATIONS

This application claims the benefit of U.S. Provisional Patent Application No. 60/870,579 entitled "APPARATUS, SYSTEM, AND METHOD FOR PRESENTING IMAGES IN A MULTIPLE DISPLAY ENVIRONMENT" and filed on Dec. 18, 2006 for Abel Davis.

BACKGROUND OF THE INVENTION

1. Field of the Invention

This invention relates to software and hardware for selecting and presenting images displayed on a primary screen to one or more secondary screens. In particular, the invention deals with presenting selected portions of dynamic program displays shown on a first screen on a second screen.

2. Description of the Related Art

As computers continue to mature, they are gaining greater use in a variety of settings. Computing systems are becoming more and more common in settings such as banks, supermarkets, and other retail establishments, where they are often used to complete transactions. Many of these systems have two displays; a primary display, used by a person in control of the transaction (such as a teller), and a secondary display, used by a person receiving information (such as a customer). In many instances, however, only some information ought to be shared. For example, a teller may have multiple accounts open on his screen, but only wants to share information concerning the customer's account on the second display.

Another common environment in which some information is shared involves sales and presentations. Multiple applications are currently available which allow a person to put together a presentation for display on a second screen; however, these applications are only effective for 'pre-packaged' presentations; that is, the presenter needs to put together all materials and organize them before the meeting. If, during the presentation, the user has a need for additional information which she wishes to present on a second screen, she must shut down the presentation software and enter a general display or 'mirror mode', where the audience sees all of the actions performed by the presenter trying to gain access to the additional material. Rummaging through files, programs, and information in search of additional material during a presentation, with the entire audience watching, generally does not convey the polished, professional feel presenters seek.

An additional difficulty is the limited ability of the audience to interact with the information being presented. Even in a one-on-one presentation, it is often difficult for the audience to reference specific parts of the display when asking questions; for example, if a lengthy written document is displayed, the person watching may have a question about a particular line—however, it is difficult to reference a particular line in a way that the presenter can quickly and easily see.

Finally, systems for making presentations, such as laptops, are generally not designed for easy use by two people. Most systems involve a single screen and require both the presenter and audience to share. Those that do have multiple screens are not configured to receive input from both users. Nor are they configured to have the second screen provide any additional benefit to the primary user outside of a presentation environment.

SUMMARY OF THE INVENTION

As such, there exists a need for a system and apparatus for effectively making presentations in a multiple-screen environment. Ideally, the system should allow a primary user to create a presentation with dynamic content, and also allow the primary user to create additional presentation features or alter the presentation without sharing all of the information and actions with the audience. In addition, a system for such an environment should ideally receive and handle input from multiple clients simultaneously, and provide information to each user concerning the input coming from the other.

The present invention has been developed in response to the present state of the art, and in particular, in response to the problems and needs in the art that have not yet been fully solved. Accordingly, the present invention has been developed to provide an apparatus, system, and method for presenting images in a multiple display environment.

The present invention comprises a computer-readable medium having computer-executable instructions for displaying output on a plurality of screens. The instructions include instructions for receiving from a primary client a selection from a primary screen, the selection comprising one of an image displayed on the primary screen and a portion of a program displayed on the primary screen. The instructions also include instructions for displaying on one or more secondary screens the selection from the primary screen received from the primary client, wherein the selected portion is separate from the source of the selected portion.

Where the selection from the primary screen is a portion of a program displayed on the primary screen, displaying on one or more secondary screens the selection from the primary screen also involves dynamically updating a display on one or more secondary screens in response to a change in the display of the selected portion of the program displayed on the primary screen. The instructions may also present the primary client with a user-responsive graphical user interface (GUI) primary screen selection tool on the primary screen. In certain embodiments, the primary client makes selections using a capture tool of the primary screen selection tool. Providing the primary screen selection tool includes providing instructions for receiving from a secondary client input from one of the one or more secondary screens and displaying the input on the primary screen selection tool on the primary screen.

In certain embodiments, a first pointer is associated with the primary screen and a second pointer is associated with one of the one or more secondary screens. In such an embodiment, the instructions may further comprise instructions for displaying the first pointer on the secondary screen in response to the first pointer being located within a captured program area of the primary screen, the first pointer configured to respond to input from the primary client associated with the primary screen. In addition, there are instructions for displaying the second pointer in the primary screen selection tool on the primary screen, where the second pointer configured to respond to input from a secondary client associated with the secondary screen.

The primary screen selection tool may further comprise a presentation view area and a private mode selection feature. The instructions include instructions for displaying on the one or more secondary screens a last image on a presentation view area of the primary screen selection tool as a static image on the one or more secondary screens in response to the primary user activating a private mode selection feature.

The instructions may further comprise instructions for placing the selection from the primary screen in a clip area of the primary screen selection tool. In such an instance, displaying on one or more secondary screens the selection from the primary screen further comprises displaying on the one or more secondary screens the selection in response to the primary user dragging the selection from the clip area to the presentation view area of the primary screen selection tool, the selection further displayed in a location on the one or more secondary screens corresponding to a location on the presentation view area containing the selection.

Also disclosed is a system for presenting images in a multiple display environment. The system comprises, in addition to modules configured to execute the instructions above, a laptop computer where the primary screen is a first screen of the laptop computer, and the secondary screen is a second screen of the laptop computer. The first screen comprises a tablet screen coupled to an interior face of an upper-chassis, and the second screen comprises a tablet screen coupled to an exterior face of the upper chassis.

In addition, the laptop comprises a power actuator configured to start the laptop computer in response to a user activating the power actuator, the power actuator disposed on an exterior portion of a laptop chassis, and a screen actuator configured to switch the primary screen to the second screen of the laptop computer in response to the user activating the screen actuator, the screen actuator disposed on an exterior portion of the laptop chassis. The laptop also has one or more speakers disposed on one or more exterior portions of the laptop chassis and an indicator configured to indicate that the primary screen is the second screen.

In certain embodiments, the laptop further comprises a polypropylene cover coupled to the upper-chassis and configured to cover the second screen, the upper-chassis further comprising an upper track and a lower track configured to guide the polypropylene cover along the length of the upper and lower track, the upper-chassis further comprising a housing configured to receive the polypropylene cover.

The system may further comprise an infra-red stylus which emits a beam of infra-red light. In such a system, the interior face of the upper-chassis of the laptop further comprises one or more of charge-coupled device (CCD) image sensors and complementary metal-oxide semiconductor (CMOS) image sensors, an infra-red detection module configured to determine a position on the first screen of the beam of infra-red light, and an infra-red stylus housing.

An additional system for presenting images in a multiple display environment is presented in the form of a dual-monitor display unit. The dual monitor display unit comprises a dual-display chassis with a screen-portion chassis and a base-portion chassis, the base-portion chassis configured to support the dual-monitor display unit. The display unit also has a first screen coupled to the screen-portion chassis of the dual-display chassis, and a second screen coupled to the screen-portion chassis of the dual-display chassis opposite the first screen. The display unit also comprises a monitor connector configured to connect a first screen to a monitor connection port of a computer and a dual-screen adapter configured to connect a second screen to a universal serial bus (USB) port of the computer.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
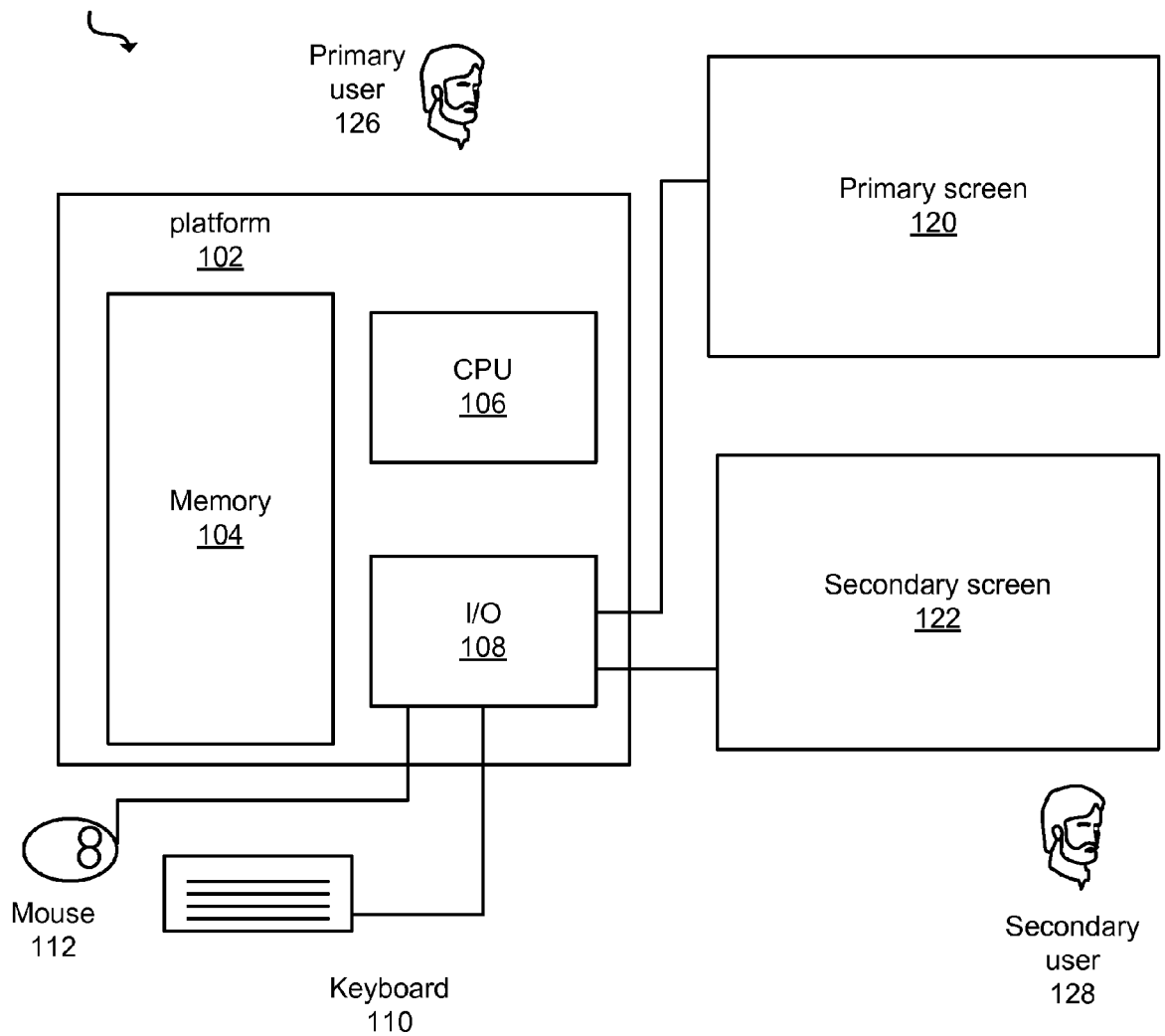
FIG. 1 is a schematic block diagram illustrating one embodiment of a system for presenting images in a multiple-screen environment.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as a processor and memory device, field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code lines, among different programs, and across several memory devices. Similarly, operational data may be identified and illustrated herein within modules and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware processors and memory, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a block diagram illustrating one embodiment of a system 100 for displaying images on a plurality of screens in accordance with the present invention. The system comprises a platform 102, the platform 102 further comprising a central processing unit (CPU) 106 memory 104, and input/output (I/O) circuitry 108. Those of skill in the art will recognize that the platform 102 comprises the necessary hardware and software elements for standard computing operations. Examples of platforms 102 include, but are not limited to, personal computers (PCs) manufactured by companies such as Lenovo, Hewlett-Packard, Dell, and others.

The system 100 further comprises input devices such as mouse 112 and keyboard 110. The I/O circuitry 108 is configured to connect to input devices and provide appropriate responses based on the user input. Additional input devices may additionally include primary screen 120 and secondary screen 122. In one embodiment, the primary screen 120 and the secondary screen 122 are tablet screens. Tablet screens are configured to respond to various stimuli, including touch (either by the user directly or through mechanical means such as a stylus), light, or other common 'touchscreen' technologies. The tablet screens may further be configured to respond to infra-red beams or other light sources, as discussed in greater detail below. The configuration of I/O circuitry 108 to respond to input from input devices such as mouse 112, keyboard 110, primary screen 120, and secondary screen 122 are well-known to those of skill in the art.

The primary screen 120 and secondary screen 122 may also comprise other display units such as standard computer monitors, televisions, projectors, or other means of presenting static and dynamic images known to those in the art. While the depicted embodiment shows only a single secondary screen 122, the system 100 may comprise multiple secondary screens 122 without departing from the present invention.

The system 100 further comprises the primary screen 120 and the secondary screen 122. In addition to serving as possible input devices, the primary screen 120 and secondary screen 122 are common output devices for programs operating on the platform 102. In one embodiment, the primary screen 120 is the output source utilized directly by the primary user 126. Those of skill in the art will recognize that multiple monitors or displays may be configured to act jointly as the output source utilized by a primary user 126; as such, the primary screen 120 may itself comprise multiple hardware pieces such as computer monitors. Similarly, the secondary screen 122 is the output source utilized directly by the secondary user 128. In certain embodiments, the primary user 126 and secondary user 128 will be users; however, primary user 126 and secondary user 128 may, in certain embodiments, be computer client systems.

The primary user 126 has access to the programs and functions available as part of the platform 102, while the secondary user 128 has access to programs and functions made available to him by the primary user 126.

Figure 2:
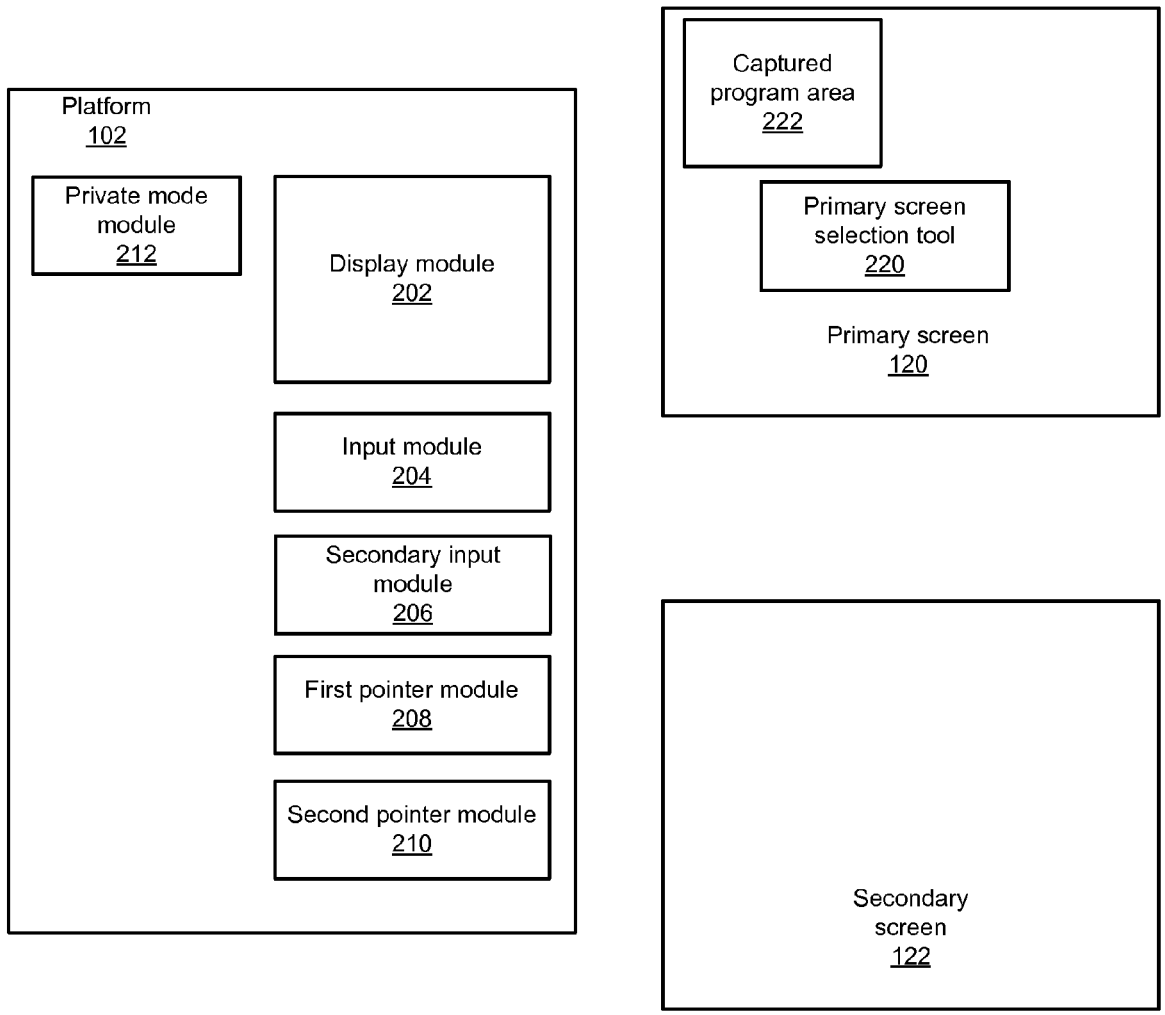
FIG. 2 is a schematic block diagram illustrating one embodiment of an apparatus configured to present images on multiple screens in accordance with the present invention.

FIG. 2 is a schematic block diagram illustrating one embodiment of an apparatus configured to present images on multiple screens in accordance with the present invention. In the depicted embodiment, the platform 102 further comprises a display module 202, input module 204, secondary input module 206, first pointer module 208, second pointer module 210, and private mode module 212.

The input module 204 is configured to receive from the primary user 126 a selection from the primary screen 120. The selection may comprise one of an image on the primary screen 120, and a portion of a program displayed on the primary screen 120. As used in this specification, an image is a representation rendered on a primary screen 120. The selected image is additionally a static representation of all or part of the image displayed on the primary screen 120. As such, if an image is selected from the primary screen 120 while it is running a dynamic program (such as, for example, a movie), the image is a static image of the selected portion of the program at the moment the selection was made by the primary user 126. The selection process is described in further detail below.

A portion of a program refers to a dynamic, or non-static selection made from the primary screen 120 by the primary user 126. As such, the changes occurring to the display on the primary screen 120 are part of the program selection. To refer again to the movie example, the primary user 126 may select a portion of the program running the movie (for example, the upper-left hand portion), and the selection of the portion of the program comprises both the image at the time of capture for that particular portion, along with the dynamic change in content. Thus, if the portion of the movie is displayed on the secondary screen 122, the changes in the display of the upper-left hand portion of the program on the primary screen 120 are also shown on the secondary screen 122.

The input module 204 is further configured to receive input from the primary user 126. As discussed above, input devices may include the mouse 112 and the keyboard 110. In one embodiment, the input module 204 is further configured to receive from the primary user 126 input from the primary screen 120. For example, the primary screen 120 may be a tablet screen.

The platform 102 further comprises a secondary input module 206. The secondary input module 206 receives from the secondary user 128 input from the secondary screen 122. As above, the secondary screen 122 may be a tablet screen that accepts input from the secondary user 128. The secondary input module 206 and input module 204 are configured to communicate with the I/O circuitry 108 and translate the signals into appropriate operations.

The platform 102 further comprises a display module 202. The display module 202 is configured to display on the secondary screen 122 the selection from the primary screen 120 received from the primary user 126. As described above, the selection may be an image. The selection may also be a portion of a program. As discussed above, where the selection is a portion of a program, the display module 202 dynamically updates the display on the secondary screen 122 in response to changes in the display of the portion of the program displayed on the primary screen 120. In addition, the selected portion is separate from the source of the selected portion. As such, the selected portion is shown on both the primary screen 120 and the secondary screen 122 and, in some embodiments, are independent of each other.

In order to determine what changes need to be made when a program or a portion of a program is selected, the display module 202 is configured to listen for messages that may be relevant to the program. In one embodiment, these messages are Windows messages in a Windows environment; however, those of skill in the art will recognize that the display module 202 may be configured to listen, or monitor for equivalent messages in different operating system environments.

For example, the primary user 126 may choose to have a program captured from an application GUI and displayed on the secondary screen 122 updated as changes are made to the program display. If the program is a word-processing program, and new text is entered by the primary user 126, the primary user 126 may want those changes to show on the secondary screen 122. The display module 202 monitors the relevant messages indicating that a change in the program necessitating a change in the display has occurred, and uses that information to create appropriate corresponding changes in the secondary screen 122.

In one embodiment, the display module 202 may include a data structure containing a list of the user-selected programs which are to be monitored for changes. When a message affecting the display data of a program in the data structure is issued, the display module 202 issues similar requests such that the information displayed on the secondary screen 122 is updated accordingly.

In certain embodiments, the system 100 further comprises a primary screen selection tool 220 displayed on the primary screen 120. The primary screen selection tool 220 comprises a user-responsive graphical user interface (GUI). The primary screen selection tool 220 further comprises a presentation view area 320 discussed in greater detail below. The display module 202 is also configured to display input from the primary screen 120 and input from the secondary screen 122 on the presentation view area 320 of the primary screen selection tool 220.

The first pointer module 208 is configured to respond to input from the primary user 126 and display the first pointer on the secondary screen 122 when the pointer is positioned within a captured program area 222 of the primary screen 120. The primary screen selection tool 220 defines the captured program area 222 based on input from the primary user 126. The first pointer, as referenced above, refers to the pointer (such as a mouse pointer) which appears on the primary screen 120 as part of the OS GUI, allowing the primary user 126 to interact with certain programs and features running on the platform 102.

The captured program area 222 represents a selection of a program with a display on the primary screen 120. In certain embodiments, the captured program area 222 is the entire program GUI, while in other embodiments the captured program area 222 is a portion of a program GUI displayed on the primary screen 120.

The second pointer module 210 is configured to respond to input from the secondary user 128 associated with the second screen 122. In one embodiment, the input comes by way of a stylus where the secondary screen 122 is a tablet screen and properly connected to the I/O circuitry 108.

The first pointer module 208 and second pointer module 210 are configured such that the platform 102 may properly receive and interpret multiple input device signals simultaneously. Thus, both the primary user 126 and secondary user 128 may enter input through respective, designated primary and secondary input devices input to the system 100. The display module 202 is further configured to support multiple simultaneous input, being configured to display the second pointer on the presentation view area 320 of the primary screen selection tool 220 on the primary screen 120.

As such, not only may a secondary user 128 enter input independently of the primary user 126, the primary user 126 can also see on the primary screen selection tool 220 what actions the secondary user 128 is performing. Such actions may include pointing to a particular part of a presentation and may also include entering edits to the display; for example, a secondary user 128 may suggest a revision to a text document by clicking on a portion of the text with a mouse, and then entering suggested text with a secondary keyboard.

The platform 102 further comprises a private mode module 212. The private mode module is configured such that, when enabled by the primary user 126, the secondary screen 122 displays the last image of the presentation view area 320 as a static image on the secondary screen 122. In one embodiment, the private mode module is enabled through a private mode selection feature which is part of the primary screen selection tool 220. By activating the private mode module 212, the primary user 126 can freeze the image on the secondary screen 122, even if one or more of the selections for display on the secondary screen 122 are programs. As noted above, where a portion of a program is selected, the image to the secondary screen 122 is continuously updated. The private mode module 212 allows the primary user 126 to essentially disable this continuous capture feature and make changes or perform actions without showing those actions to the secondary user 128 via the secondary screen 122.

Figure 3:
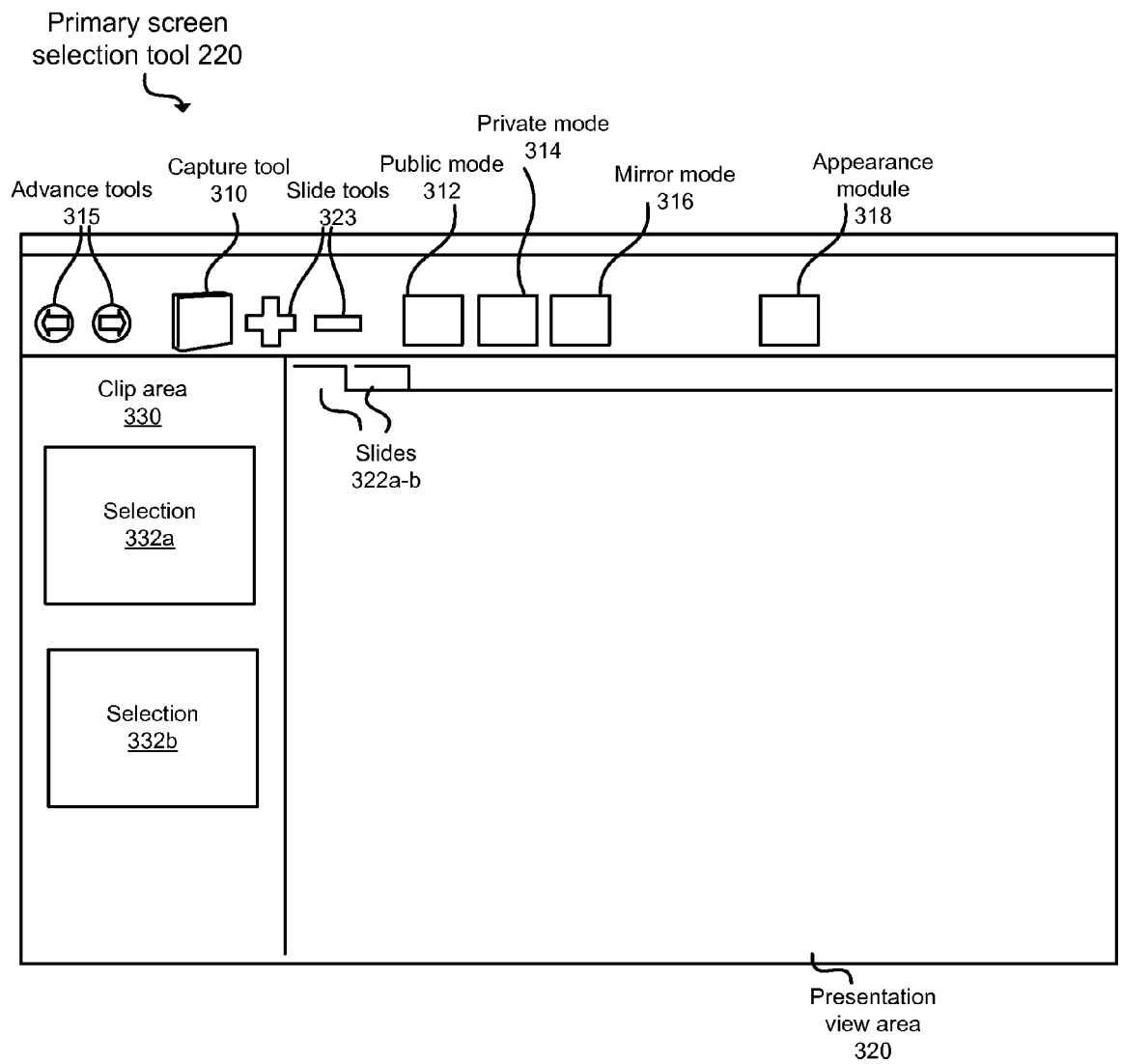
FIG. 3 is a schematic block diagram illustrating one embodiment of a primary screen selection tool.

FIG. 3 illustrates one embodiment of a primary screen selection tool 220 GUI. The primary screen selection tool, as discussed above, is a GUI displayed on the primary screen 120 and allows the primary user 126 to make selections such as selections 332a-b that can be displayed on the secondary screen 122. In addition, the primary screen selection tool 220 displays input information from the secondary user 128 in the presentation view area 320, allowing the primary user 126 to easily see what input and information the secondary user 128 wishes to communicate.

The primary screen selection tool 220 comprises a capture tool 310. The primary user 126 uses the capture tool 310 to make selections 332a-b which can then be displayed on the secondary screen 122. In one embodiment, when the primary user 126 selects the capture tool 310, the primary user 126 may then use a mouse to draw a box circumscribing the area she wishes to capture and make available for display. Those of skill in the art will recognize that other methods of selecting areas for display may be utilized without departing from the present invention. The capture tool 310 further allows the primary user 126 to specify whether the selection is simply an image selection or a portion of a program selection. When the primary user 126 makes the selection using the capture tool 310, the selection is placed in the clip area 330.

The clip area 330 acts as a storage area for selections 332a-b, from which the primary user 126 may create slides 322. While two selections 332a-b are shown, the clip area 330 is not limited to any particular number of selections 332a-b. In one embodiment, each selection 332a-b is a thumbnail image of the relevant image or program selected, allowing the primary user 126 to easily identify what has been captured and is available for display.

The primary user 126 may then move one or more of the selections 332a-b to the presentation view area 320 of the primary screen selection tool 220. When a selection 332a-b is placed in the presentation view area 320, the selection 332a-b is available for display on the secondary screen 128. The presentation view area 320 may be made of one or more slides 322a-b. Each slide 322a-b represents a particular composition for display on the secondary screen 122 as part of the presentation view area 320. In one embodiment, individual slides are represented in relation to one another as tabs, as shown in FIG. 3. The primary user 126 chooses a slide to activate by clicking on the tab portion. When a particular slide 322a-b is active (such as slide 322a as depicted), the selections 332*a-b* which make up that slide 332*a* are shown in the presentation view area 230 and on the secondary screen 122.

The primary screen selection tool 220 may further comprise a public mode 312 selection feature. As discussed above, when the primary user 126 activates the public mode 312, the selections 332*a-b* which are in the presentation view area 320 are active and shown on the secondary screen 128. In addition, if the selection 332*a-b* comprises a portion of a program, the display on the presentation view area 320 and on the secondary screen 128 is dynamically updated in response to a change in the display of the portion of the program displayed on the primary screen 126. This portion of the program, in certain embodiments, is the equivalent of the captured program area 222. If the selection 332*a-b* is an image, the static image selection 332*a-b* is displayed on the primary screen selection tool 220 and the secondary screen 128.

The primary screen selection tool 220 further comprises a private mode 314 selection feature. When the primary user 126 activates the private mode 314, the display on the presentation view area 320 and on the secondary screen 122 is held static; that is, the last image on the presentation view area 320 before the primary user 126 selected the private mode 314 is held as a static image on both the presentation view area 320 and the secondary screen 122. The private mode 314 allows the primary user 126 to perform actions without displaying them on the secondary screen 122. For example, the primary user 126 may create additional slides with new material for display.

The mirror mode 316 selection feature allows the primary user 126 to treat the secondary screen 122 as a reflection of his own screen. As such, when in mirror mode, the secondary screen 122 shows a display identical to that of the primary screen 120. Means for invoking a mirror mode 316 configuration are made a part of most standard operating systems. The primary screen selection tool 220, however, provides easy activation of this feature in a multiple-display environment, whereas most operating systems have the feature hidden deep within menus and options. By making the mirror mode 316 available from the primary screen selection tool 220 GUI, the present invention facilitates easy access to a useful tool.

The appearance module 318 provides a tool which allows the primary user 126 to configure the appearance for the primary screen 120 and the secondary screen 122. The appearance module 318 may be leveraged to provide an appropriate 'look and feel' for a particular use. For example, for a collaborative effort, where the primary user 126 is using a computer running the Windows XP platform, the primary user 126 may want both the primary screen 120 and the secondary screen 122 to have a Windows XP theme. In contrast, in a bank, the primary user 126 may want a Windows XP platform theme for the primary screen 120, but may have developed a particular 'skin' or style for the appearance on the secondary screen 122. The primary user 126 can select from a variety A of skins to provide an appropriate style for all participants.

The primary screen selection tool 220 may further comprise, in certain embodiments, advance tools 315 and slide tools 323 to facilitate presenting and creating slides 322*a-b*. The advance tools 315 may be used to move sequentially forwards or backwards through the slides 322*a-b* in the presentation view area 320. The primary user 126 may also select slides for viewing by clicking on the tabular portion of the slide 322 in the presentation view area 320. The slide tools 323 may also be used to add or remove slides 322*a-b* from the presentation view area 320 by choosing the plus sign or minus sign respectively. Other methods of adding and removing slides may also be implemented along with or independent of the slide tools 323; for example, a primary user 126 may right-click with a mouse in the presentation view area 320 and select from a resulting drop-down menu features which add or delete slides 322*a-b*.

Figure 4:
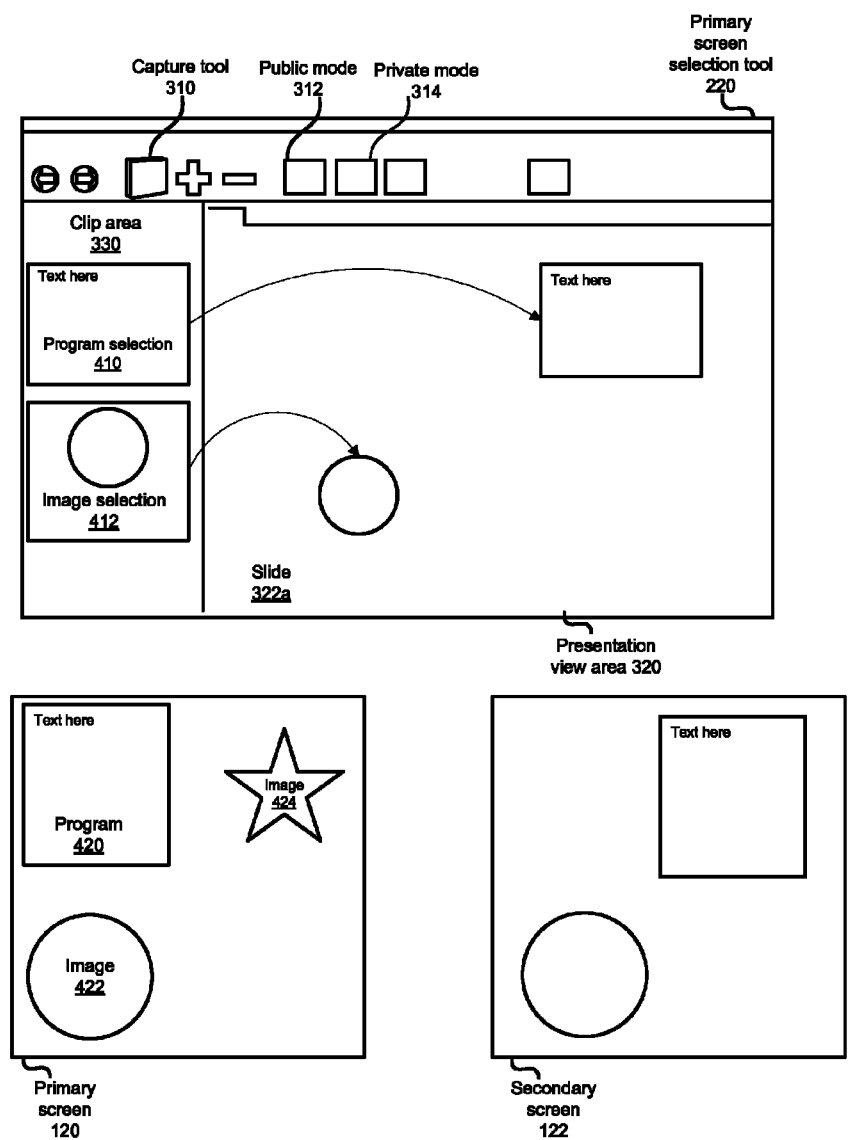
FIG. 4 is a schematic block diagram illustrating an example of the use of the primary screen selection tool.

FIG. 4 illustrates one an example of the use of the primary screen selection tool 220. The illustration shows the primary screen 120, primary screen selection tool 220, and the secondary screen 122. While the depiction does not show the primary screen selection tool 220 on the primary screen 120, and is fact depicted separate from it, the separation is made for ease of illustration; in many embodiments, the primary screen selection tool 220 is also part of the primary screen 120 display.

In the depicted example, the primary user 126 has a program 420 operating and displayed on the primary screen 120, along with image 422 and image 424. Image 422 may be, for example, a picture. The primary user 126 activates the capture tool 310 in a program selection mode and makes the program selection 410 from program 420. The program selection 410 may be either a part of the program 420 displayed on the primary screen 120, or the entire program. When the primary user 126 indicates she has made the selection she wants, the program selection 410 appears in the clip area 330 of the primary screen selection tool 220. In addition, the primary screen selection tool 220 designates the relevant area (in this case, the rectangle designated program 420) a captured program area 222.

The primary user 126 may then decide to capture an image from the primary screen 120. As such, the primary user 126 activates the image mode of the capture tool 310 and makes a selection encompassing the image 422. As discussed above, an image capture is not restricted to static images on the primary screen 120; for example, the image selection 412 may be a captured frame of a movie, or simply a static display of a program such as a text-editing program. When the image selection process using the capture tool 310 is complete, the image selection 412 appears in the clip area 330. As depicted, the two selections 410 and 412 in the clip area are displayed as thumbnail images of the source selections.

The primary user 126 may have performed all of these steps with the private mode 314 activated, such that the actions are not displayed on the secondary screen 122. With the private mode 314 activated, the primary user 126 may then compose a slide 322*a* using the program selection 410 and the image selection 412. In one embodiment, the primary user 126 uses a mouse 112 to drag the program selection 410 from the clip area 330 to the presentation view area 320. As shown, the primary user 126 drags the program selection 410 from the clip area 330 to the far right portion of the slide 322*a*. Similarly, the primary user 126 drags the image selection 412 to the lower-left portion of the slide 322*a*.

With the slide 322*a* composed, the primary user 126 activates the public mode 312. The slide 322*a* composition in the presentation view area 320 is displayed on the secondary screen 122. Thus, in response to the primary user 126 dragging the selections 410 and 412 from the clip area 330 to the presentation view area 320, the selections 410 and 412 are displayed in a location on the secondary screen 122 corresponding to a location on the presentation view area 320 containing the selections 410 and 412.

Because the public mode 312 is activated, the display on the secondary screen 122 and in the presentation view area 320 is dynamically updated in response to a change in the display of the selected program 420 (or a portion of that program) on the primary screen 120. For example, the program 420 depicted is a text-editing program with the phrase "Text here" within its GUI display. The primary user 126 may change the text to read "Now, write this text" in the program 420. As the primary user 126 makes the edits (such as deleting the text and entering the individual letters of the new text) the edits show in both the presentation view area 320 and on the secondary screen 122. In contrast, if the primary user 126 changes the image 422 (by, for example, moving to the next picture), the image represented on the presentation view area 320 and secondary screen 122 remains static, despite the fact that the public mode 312 is active.

In one embodiment, if the primary user 126 places his pointer within the captured program area 222 of the primary screen 120 (here defined by the same boundaries encompassing program 420), then a scaled version of the pointer is displayed on both the presentation view area 320 and the secondary screen. As a result, the primary user 126 can easily use the pointer to reference selected portions of the program 420 for the secondary user 128 to see on the secondary screen 122. In another embodiment, the pointer is displayed on the secondary screen 122 when the pointer is placed within the presentation view area. Thus, the presentation view area 320 becomes an accurate replica of the display on the secondary screen 122 such that all activity in the presentation view area 320, including pointer movement, is shown on the secondary screen 122 while the public mode 312 is the active feature.

Similarly, the secondary user 128 may use a separate input device to reference areas of the secondary screen 122. In one embodiment, the secondary screen 122 is a tablet screen, and the secondary user 128 uses a stylus to provide input. If, for example, the secondary user 128 were to circle the phrase 'text here', the circle would be displayed around the phrase 'text here' in the presentation view area 320. The circle would not, however, show up over the program 420. Alternatively, the secondary user 128 may change the phrase to 'text there.' This change would be reflected in the presentation view area 320. In one embodiment, the program 420 is insulated from such changes such that any edits are not reflected in the program 420 itself not its data without authorization from the primary user 126. In another embodiment, the changes made by the secondary user 128 are rippled through to both the display in the presentation view area 320 and to the program 420.

As such, the secondary user 128 is only able to view on the secondary screen 122 information that the primary user 126 selects for display. For example, the image 424 on the primary screen 120 is not available to the secondary user 128 through the secondary screen 122. In addition, the primary user 126 may present information and images on the secondary screen 122 in a different format than that used on the primary screen 120. As shown, the program 420 is displayed in a different location on the secondary screen 122 than the location on the primary screen 120.

Those of skill in the art will further appreciate that the selected portion is separate from the source of the selected portion (such as image 422). As such, the primary user 126 may alter or amend the image 422 without affecting how the selected portion is displayed on the secondary screen 122. For example, the primary user 126 may close or edit the image 422 on the primary screen 120 which is the source of the selected portion without affecting the display of the selected portion on the secondary screen 122. Even where the selected portion is a portion of a program (such as program 420), and the image on the secondary screen 122 is dynamically updated, the source of the selected portion of the program and the program itself are still properly considered separate.

Another example of use of the present invention involves gaming applications. For example, a multi-monitor environment, such as the laptop computer 600 shown in connection with FIG. 6, may lend itself naturally to games, particularly those where players are shown separate information that must be kept secret from the other player. The primary screen selection tool 220 may be used to facilitate such a game. If the game were chess, the program 420 running the chess application could be selected and displayed on the secondary screen 122 as discussed above. A player using the primary screen 120 could then enter input controlling her pieces via input devices associated with the primary screen 120. A second player could enter input controlling his pieces via a secondary input device; for example, the secondary screen 122 may be a tablet screen responsive to touch. As discussed above, the two input devices may operate completely independent of one another.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
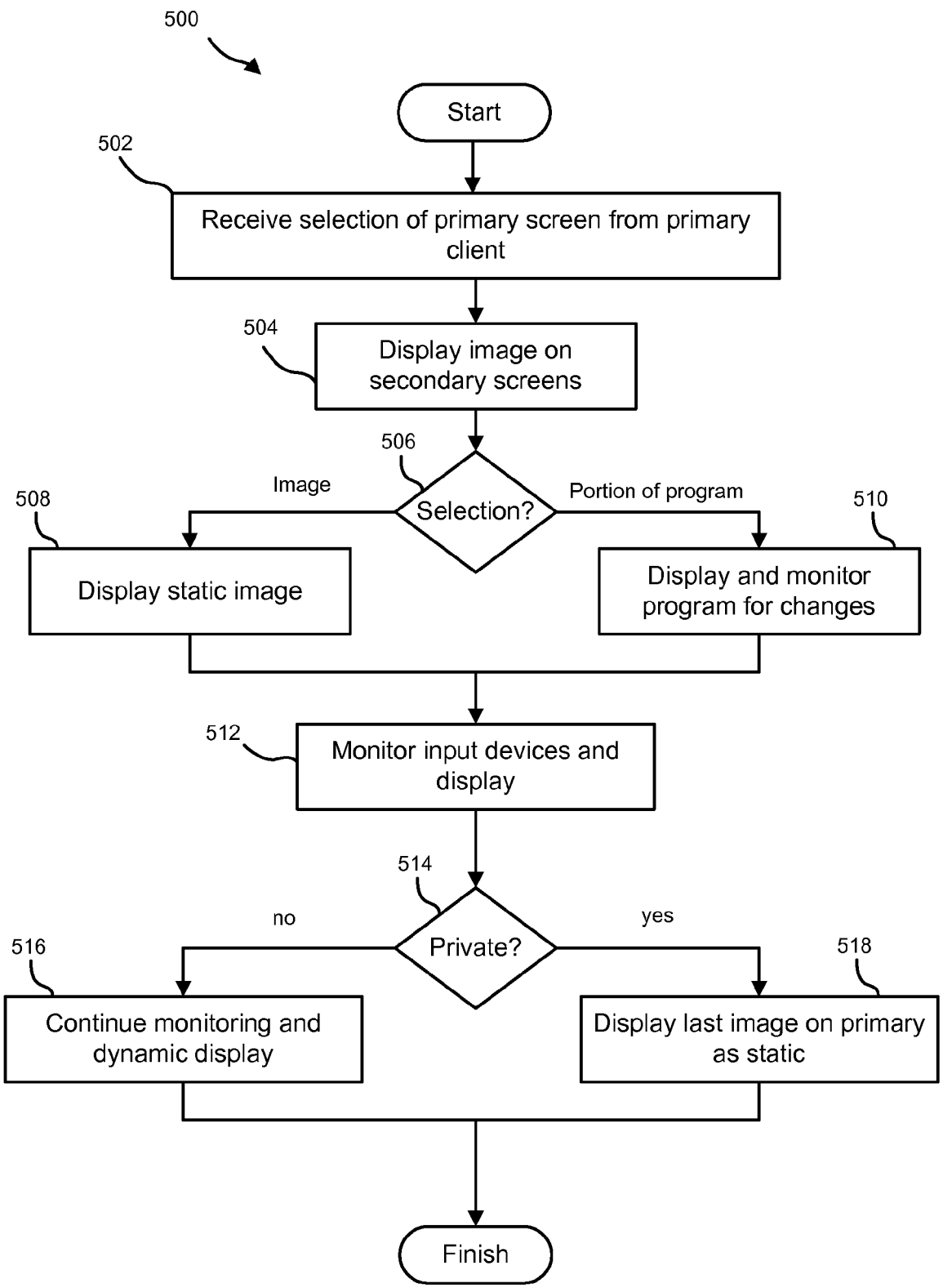
FIG. 5 is a schematic flow chart diagram illustrating one embodiment of presenting images on multiple screens in accordance with the present invention.

FIG. 5 is a schematic flow chart diagram illustrating one embodiment of presenting images on multiple screens in accordance with the present invention. The method 500 starts with the input module 204 receiving 502 a selection from the primary screen 120 from the primary user 126. The display module 202 displays on the secondary screen 122 the selection from the primary screen 120.

If the selection is determined 506 to be an image from the primary screen 120, the display module 202 displays 508 on the secondary screen 122 a static image of the selection. If the selection is determined 506 to be a portion of a program displayed on the primary screen 120, the display module 202 dynamically displays 510 the program and monitors the program for changes. As discussed above, this involves dynamically updating the display on the secondary screen 122 in response to a change in the display of the portion of the program displayed on the primary screen 120 such that the image of the selected program on the secondary screen 122 is identical to the image of the selected program on the primary screen 120.

The method 500 further comprises monitoring 512 input devices and displaying the pointers, as discussed above, when a first pointer used by the primary user 126 is positioned within a captured program area 222 of the primary screen 120. Similarly, the second pointer used by the secondary user 128 is displayed in the primary screen selection tool 220 on the primary screen 120. The second pointer responds to input from the secondary user 128 through input devices such as a stylus.

The method 500 further comprises determining 514 whether the private mode 314 feature is active. If so, the last image on the presentation view area 320 of the primary screen selection tool 220 before the private mode 314 feature was activated is shown as a static image on the secondary screen 122. If the public mode 312 feature is active, the process of monitoring 516 and displaying described above continues.

Figure 6:
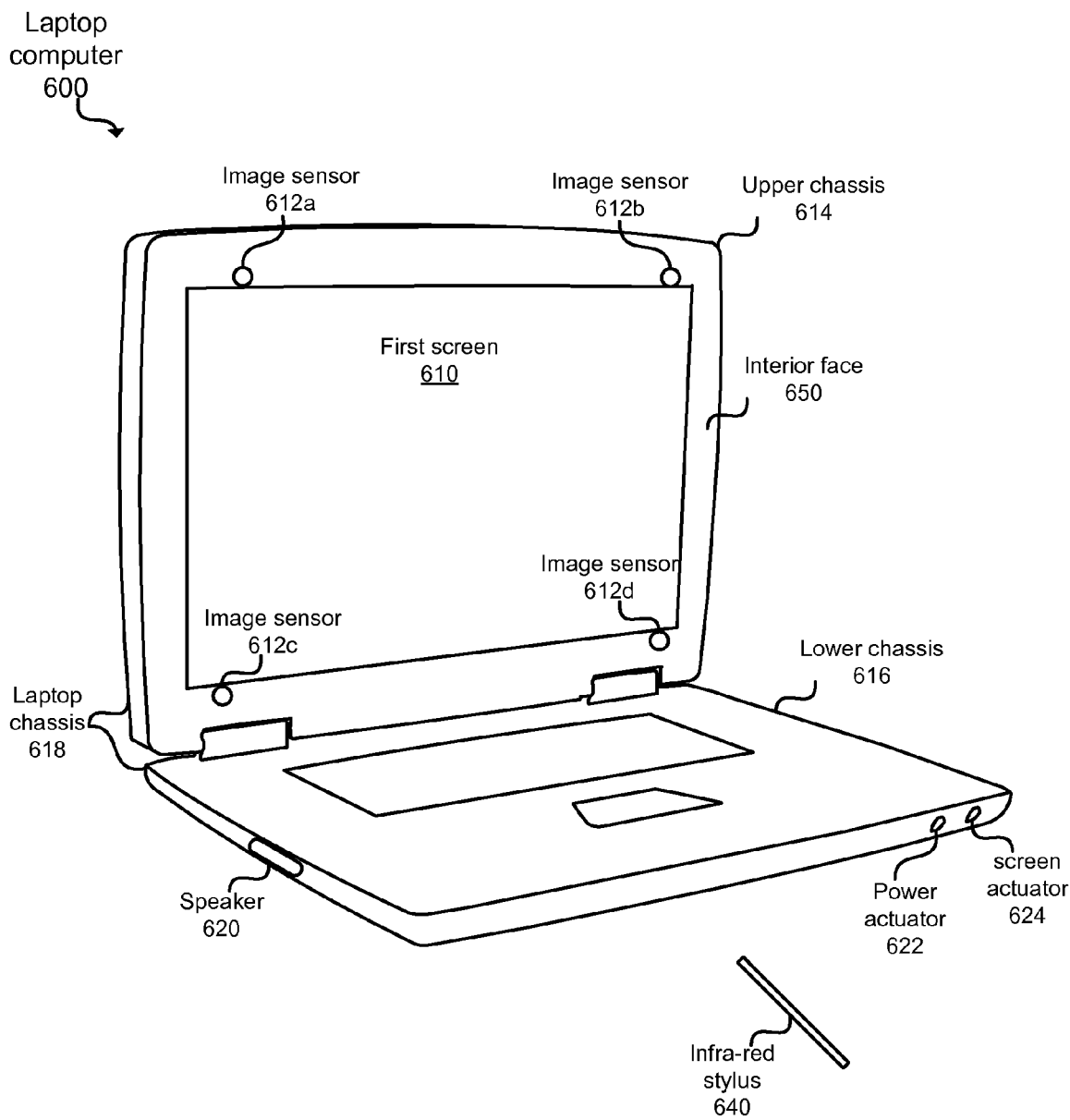
FIG. 6 is an illustration of a laptop computer comprising multiple screens in accordance with the present invention.

FIG. 6 shows an illustration of a laptop computer 600 comprising multiple screens in accordance with the present invention. In the depicted embodiment, the primary screen 120 is the first screen 610, and the secondary screen 122 is the second screen 710. The first screen 610 is a tablet screen coupled to the interior face 650 of the upper-chassis 614 of the laptop computer 600. The second screen 710 is also a tablet screen coupled to the exterior face 750 of the upper-chassis 614.

In certain embodiments, the interior face 650 of the laptop computer 600 further comprises one or more image sensors 612a-d. The image sensors 612a-d may be charge-coupled device (CCD) image sensors or complementary metal-oxide semiconductor (CMOS) image sensors, or some combination of the two. The image sensors 612a-d can detect the intensity of a light beam directed at a point on first screen 610. By comparing the measured intensity at the location for the image sensors 612a-d, an infra-red detection module (not shown) built into the laptop computer 600 and configured to receive input from the image sensors 612a-d can determine the position on the first screen 610 of the beam of light.

In one embodiment, the image sensors 612a-d are located at regular intervals along the periphery of the first screen 610. A user, such as the primary user 126, may utilize an infra-red stylus 640 that emits a beam of infra-red light to provide input to the laptop computer 600. The beam of light emitted by the infra-red stylus 640 and directed onto the first screen 160 provides the x-y location for a pointer. By targeting the beam to different points on the first screen 610, the infra-red detection module, using the input provided by the image sensors 612a-d, can direct the relevant software modules to move the pointer to the targeted locations.

The infra-red stylus 640 may further be configured with buttons allowing a user to perform the equivalent of a traditional 'click' operation on GUIs on the first screen 610. In one embodiment, the infra-red stylus communicates that the user has pressed a button using a wireless protocol such as Bluetooth.

In certain embodiments, the laptop computer 600 further comprises an infra-red stylus housing unit (not shown). The infra-red stylus housing unit is configured to receive the infra-red stylus 640 and retain it when the stylus 640 is not in use.

The laptop computer 600 may further comprise a power actuator 622 that is configured to start the laptop computer 600 when a user activates the power actuator 622. In typical embodiments, the power actuator 622 is a power button. The power actuator 622 is disposed on an exterior portion of the laptop chassis 618. An exterior portion is any face of the laptop chassis 618 which can be accessed without opening the laptop 300 such that the interior face 650 is exposed.

The laptop computer 600 also has a screen actuator 624 which is configured to switch the primary screen 120 from the first screen 610 to the second screen 710 when a user activates the screen actuator 624. The screen actuator 624 is disposed on an exterior portion of the of the laptop chassis 618.

By locating the power actuator 622 and screen actuator 624 on an exterior portion of the laptop chassis 618, a user can operate the laptop computer 600 without having to open the first screen 610; as a result, the laptop computer 600 can be easily used in confined spaces such in a seat on an airplane. Where the second screen 710 is a tablet screen, the user turns the laptop computer 600 on using the power actuator 622, switches the primary screen to the second screen 710, and may then enter input through the second screen 710.

In certain embodiments, the laptop computer 600 further comprises one or more speakers 620 which are disposed on one or more exterior portions of the laptop chassis 618. By locating the speakers 620 on exterior portions of the laptop chassis 618, sound can come out clearly regardless of whether or not the laptop computer 600 is in an open position, or closed with the second screen 710 being used as the primary screen.

The laptop computer 600 may further comprise an indicator 712 configured to indicate that the primary screen is the second screen 710. In one embodiment, the indicator 712 is a light which is lighted when the second screen 710 is set to be the primary screen.

Figure 7:
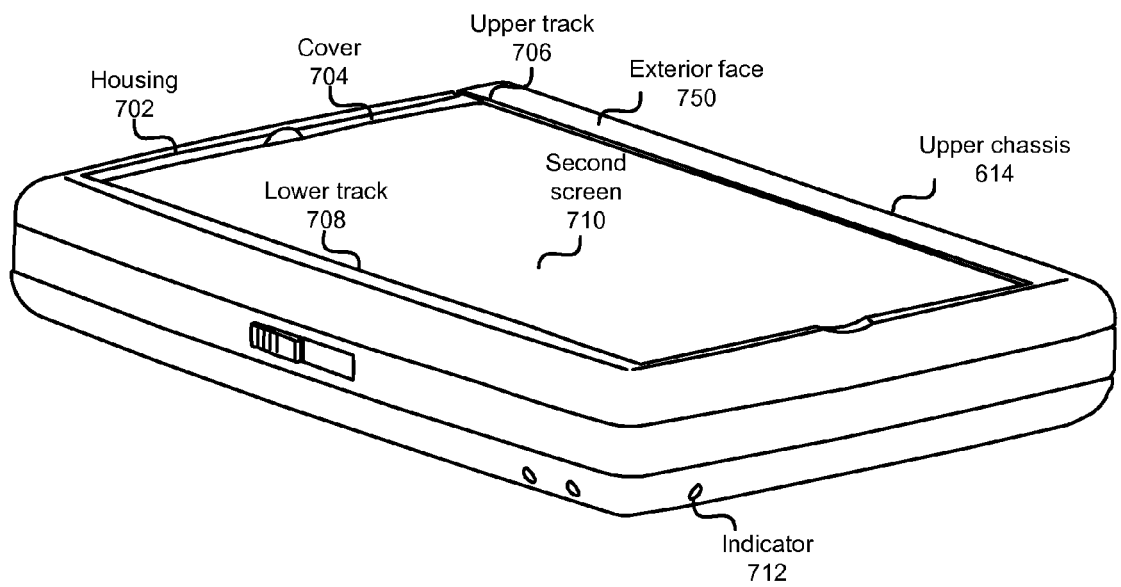
FIG. 7 is a second perspective of the illustration of a laptop computer comprising multiple screens in accordance with the present invention.

FIG. 7 shows a second perspective of the illustration of a laptop computer 300 comprising multiple screens in accordance with the present invention. FIG. 7 shows the laptop computer 600 in a closed position, with the second screen 710 exposed. In the depicted embodiment, the laptop computer 600 further comprises a cover 704 coupled to the upper-chassis 614 and configured to cover the second screen 710. The cover 704 has sufficient flex to it to allow the cover 704 to 'roll' into the housing 702, similar to a roll-top desk. In one embodiment, the cover 704 is a polypropylene cover which can be pulled across the second screen 710 in order to cover the second screen 710 and protect it when the laptop computer 300 is not in use.

When the laptop computer 600 is in use, the cover 704 slides into a housing 702 which receives and holds the cover 704. The housing 702 is built into the upper-chassis 614; in one embodiment, the housing 702 is located between the first screen 610 and the second screen 710.

In an alternative embodiment, the cover 704 is made from a solid, rigid material with little flexibility in any direction. In such an embodiment, the housing 702 may be an opening in the lower-chassis 616 into which the user can slide the cover 704 when the laptop computer 300 is not in use. In an alternative embodiment, the bottom of the lower chassis 616 may comprise clips configured to connect to the cover 704 and hold the cover 704 while the cover 704 is off.

Alternatively, the cover 704 on the second screen 710 may comprise a substantially rigid material configured to completely cover the second screen 710 and coupled to the upper chassis 614 with one or more hinges. In such an embodiment, the upper chassis 614 may further comprise a mechanical cover-retention device configured to hold the cover 704 in a shut position which completely covers the second screen 710. In response to a user pressing a button or sliding a slide bar, the cover-retention device releases the cover 704 such that the user may open the cover 704 by swinging it on the hinges and exposing the second screen 710.

Where the cover 704 is configured to fit within the housing 702 on the upper chassis 614, the upper chassis 614 further comprises an upper track 706 and a lower track 708 which guide the cover 704 along the length of the upper track 706 and the lower track 708. The user pulls the cover 704 along the length of the tracks 706 and 708 until the second screen 710 is completely covered by the cover 704. To open the second screen, the user slides the cover 704 along the length of the tracks 706 and into the housing 702 until the second screen 710 is uncovered.

Figure 8:
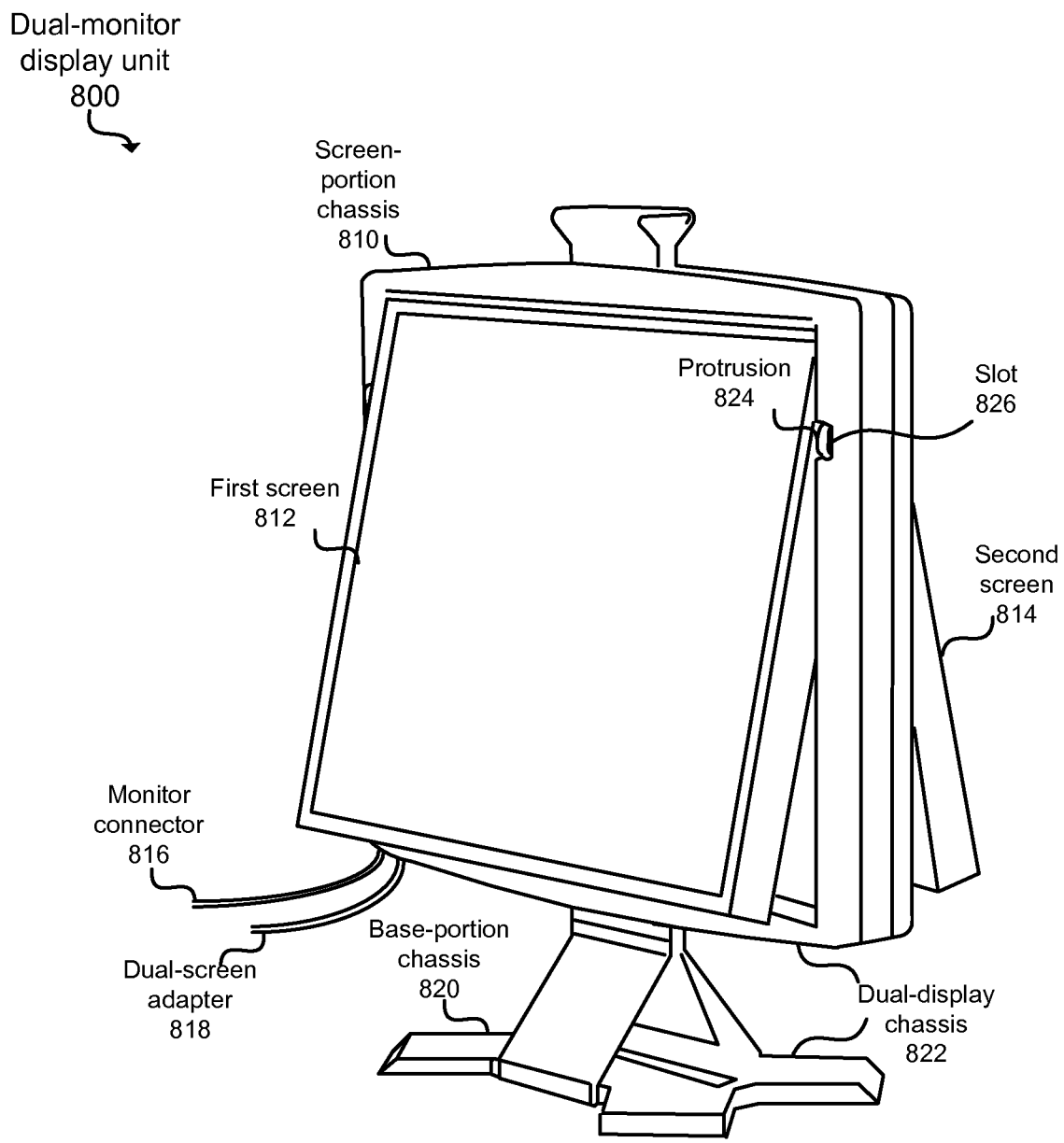
FIG. 8 is an illustration of a dual-monitor display unit.

FIG. 8 is an illustration of a dual-monitor display unit 800. The dual-monitor display 800 is one example of a suitable multiple-monitor environment for the present invention. The dual-monitor display unit 800 comprises a dual-display chassis 822 made up of a screen-portion chassis 810 and a base-portion chassis 820. The base-portion chassis 820 provides the support for the dual-monitor display unit 800. The screen-portion chassis 810 holds the first screen 812 and second screen 814.

The first screen 812 is coupled to the screen-portion chassis 810 of the dual-display chassis 822. In one embodiment, the first screen 812 is coupled to the screen-portion chassis 810 such that the first screen 812 may be angled relative to the plane of the screen-portion chassis 810 in order to facilitate easier viewing. In one embodiment, the first screen 812 comprises a protrusion 824 which fits within a slot 826 in the screen-portion chassis 810. The dual-monitor display unit 800 may further comprise a second protrusion and slot (not shown) configured in a like manner on the second side of the first screen 812. In such an embodiment, the protrusion 824 and slot 826 juncture may be configured such that the first screen 812 may be tilted out of the plane of the screen-portion chassis 810 as shown in FIG. 8.

The dual-monitor display unit 800 further comprises a second screen 814 coupled to the screen-portion chassis 810 opposite the first screen 812, as shown in FIG. 8. The second screen 814 may also be coupled to the screen-portion chassis 810 such that it may be angled as described above in relation to the first screen 812.

The dual-monitor display unit 800 also comprises a monitor connector 816 configured to connect the first screen 812 to a monitor connection port of a computer. A monitor connector 816 allows the hardware of the computer to connect to the hardware of the first screen 812 in order to facilitate the exchange of data and information necessary to present an image on the first screen 812. Examples of common monitor connectors 816 include, but are not limited to VGA cable and DVI cable.

In addition, the dual-monitor display unit 800 comprises a dual-screen adapter 818. The dual-screen adapter 818 is configured to connect the second screen 814 to a universal serial bus (USB) port of the computer. Those of skill in the art will recognize that the USB is a serial bus that provides a single, standardized interface socket common on most computer systems. The USB allows devices to be connected and disconnected without restarting the computer. The dual-screen adapter 818 allows a user to connect a monitor (such as the second screen 814) to a computer without using a monitor connection port of the computer. One example of a dual-screen adapter 818 is StarTech.com's USB 2.0 to VGA Dual Display Adapter—graphics adapter.

By providing both a monitor connector 816 and the dual-screen adapter 818, configured to be connected to a monitor connection port and a USB port of a computer respectively, the dual-monitor display unit 800 allows the majority of modern computing systems to run dual displays regardless of the number or availability of monitor connection ports. As such, the dual-monitor display unit 800 provides an easily configurable and portable dual-screen environment to which a computer executing the dual-display software described above may be attached.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A non-transitory storage device storing computer-executable instructions for displaying output on a plurality of screens, the instructions executed to perform:
    displaying, on a primary screen, a graphical user interface (GUI) comprising a capture tool for selecting a portion of a display on the primary screen;
    receiving, from the capture tool, a selected portion of the display on the primary screen, wherein the selected portion at least partially encompasses a program displayed in a presentation view area on the primary screen, and wherein the selected portion is a subset of the display on the primary screen;
    receiving input from a first secondary screen of one or more secondary screens;
    displaying the input from the first secondary screen on the selected portion, wherein a first pointer is associated with the primary screen and a second pointer is associated with the first secondary screen;
    displaying the first pointer on the one or more secondary screens in response to the first pointer being positioned within the selected portion of the primary screen, the first pointer configured to respond to input from a primary user associated with the primary screen;
    displaying the second pointer on the primary screen, the second pointer configured to respond to input from a secondary user associated with the first secondary screen; and
    simultaneously displaying on the one or more secondary screens a last image of the program as a static image on the one or more secondary screens in response selecting a private mode button wherein the static image is not updated as the displayed program changes.

2. The non-transitory storage device of claim 1, further comprising instructions for:
    placing the selected portion of the primary screen in a clip area of the capture tool in response to a primary user selecting the selected portion;
    displaying the selected portion on one or more secondary screens in response to the primary user moving the selected portion from the clip area to a presentation view area of the capture tool, wherein the selected portion is displayed on the one or more secondary screens at a location that corresponds to a location on the presentation view area where the primary user places the selected portion.

3. A system for displaying output on a plurality of screens, the system comprising:
    a primary screen configured to receive input from a primary user;
    a secondary screen configured to receive input from a secondary user;
    a processor and memory comprising:
    an input module configured to receive a selected portion of the primary screen defining a captured program area of a primary screen that at least partially encompasses a program displayed in a presentation view area on the primary screen, wherein the selected portion is a subset of what is displayed on the primary screen, and receive input from the secondary screen; and
    a display module configured to:
        simultaneously display the input from the secondary screen on the selected portion, wherein a first pointer is associated with the primary screen and a second pointer is associated with the secondary screen, display the first pointer on the secondary screen in response to the first pointer being positioned within the selected portion of the primary screen, the first pointer configured to respond to input from the primary user associated with the primary screen, display the second pointer on the primary screen, the second pointer configured to respond to input from the secondary user associated with the secondary screen and display on the secondary screen a last image of the program as a static image on the secondary screen in response selecting a private mode button wherein the static image is not updated as the displayed program changes.

4. The system of claim 3, wherein the primary screen is a first screen of a laptop computer, the secondary screen is a second screen of a laptop computer, the first screen comprising a tablet screen coupled to an interior face of an upper-chassis, the second screen comprising a tablet screen coupled to an exterior face of the upper chassis.

5. The system of claim 4, the laptop computer further comprising:
    a power actuator configured to start the laptop computer in response to a user activating the power actuator, the power actuator disposed on an exterior portion of a laptop chassis;
    a screen actuator configured to switch the primary screen to the second screen of the laptop computer in response to the user activating the screen actuator, the screen actuator disposed on an exterior portion of the laptop chassis;
    one or more speakers disposed on one or more exterior portions of the laptop chassis; and
    an indicator configured to indicate that the primary screen is the second screen.

6. The system of claim 4, the laptop further comprising a polypropylene cover coupled to the upper-chassis and configured to cover the second screen, the upper-chassis further comprising an upper track and a lower track configured to guide the polypropylene cover along the length of the upper and lower track, the upper-chassis further comprising a housing configured to receive the polypropylene cover.

7. The system of claim 4, further comprising an infra-red stylus, the infra-red stylus emitting a beam of infra-red light, the interior face of the upper-chassis further comprising one or more of charge-coupled device (CCD) image sensors and complementary metal-oxide semiconductor (CMOS) image sensors, the laptop further comprising an infra-red detection module configured to determine a position on the first screen of the beam of infra-red light and an infra-red stylus housing.

8. The system of claim 3, further comprising a dual-monitor display unit, the dual-monitor display unit comprising:
    a dual-display chassis comprising a screen-portion chassis and a base-portion chassis, the base-portion chassis configured to support the dual-monitor display unit;
    a first screen coupled to the screen-portion chassis of the dual-display chassis;
    a second screen coupled to the screen-portion chassis of the dual-display chassis opposite the first screen;
    a monitor connector configured to connect a first screen to a monitor connection port of a computer;
    a dual-screen adapter configured to connect a second screen to a universal serial bus (USB) port of the computer.

9. A method for displaying output on a plurality of screens, the method comprising:
    receiving, from a capture tool by use of a processor, a selected portion of a primary screen defining a captured program area of the primary screen that at least partially encompasses a program displayed in a presentation view area on the primary screen, wherein the selected portion is a subset of the display on the primary screen;
    receiving input from a first secondary screen of one or more secondary screens;
    displaying the input from the first secondary screen on the selected portion, wherein a first pointer is associated with the primary screen and a second pointer is associated with the first secondary screen;
    displaying the first pointer on the one or more secondary screens In response to the first pointer being positioned within the selected portion of the primary screen, the first pointer configured to respond to input from a primary user associated with the primary screen;
    displaying the second pointer on the primary screen, the second pointer configured to respond to input from a secondary user associated with the secondary screen; and
    simultaneously displaying on the one or more secondary screens a last image of the program as a static image on the one or more secondary screens in response selecting a private mode button wherein the static image is not updated as the displayed program changes.

10. The method of claim 9, the method executed on a laptop computer, wherein the primary screen is a first screen of a laptop computer, the secondary screen is a second screen of a laptop computer, the first screen comprising a tablet screen coupled to an interior face of an upper-chassis, the second screen comprising a tablet screen coupled to an exterior face of the upper chassis, the laptop computer further comprising:
    a power actuator configured to start the laptop in response to a user activating the power actuator, the power actuator disposed on an exterior portion of a laptop chassis;
    a screen actuator configured to switch the primary screen to the second screen of the laptop computer in response to the user activating the screen actuator, the screen actuator disposed on an exterior portion of the laptop chassis; and
    one or more speakers disposed on one or more exterior portions of the laptop chassis;
    an indicator configured to indicate that the primary screen is the second screen.

11. The method of claim 10, the laptop further comprising a polypropylene cover coupled to the upper-chassis and configured to cover the second screen, the upper-chassis further comprising an upper track and a lower track configured to guide the polypropylene cover along the length of the upper and lower track, the upper-chassis further comprising a housing configured to receive the polypropylene cover.

12. The method of claim 9, the method executed on a computer in electrical communication with a dual-monitor display unit, the dual-monitor display unit comprising:
    a dual-display chassis comprising a screen-portion and a base portion, the base portion configured to support the dual-monitor display unit;
    a first screen coupled to the screen-portion chassis of the dual-display chassis;
    a second screen coupled to the screen-portion chassis of the dual-display chassis opposite the first screen;
    a monitor connector configured to connect a first screen to a monitor connection port of a computer;
    a dual-screen adapter configured to connect a second screen to a universal serial bus (USB) port of the computer.

* * * * *